United States Patent
Kaye

[11] Patent Number: 5,973,667
[45] Date of Patent: Oct. 26, 1999

[54] LEAN-TO STAND FOR FLEXIBLE DIGITIZER

[75] Inventor: Stephen T. Kaye, Elkridge, Md.

[73] Assignee: GTCO Corporation, Columbia, Md.

[21] Appl. No.: 08/896,916

[22] Filed: Jul. 18, 1997

[51] Int. Cl.[6] .................................................. A63H 33/04
[52] U.S. Cl. ...................... 345/156; 345/173; 312/257.1
[58] Field of Search ..................................... 345/156–179

[56] References Cited

U.S. PATENT DOCUMENTS

| | | | |
|---|---|---|---|
| 3,659,355 | 5/1972 | Aubin, Jr. | 434/408 |
| 4,828,502 | 5/1989 | Leahy | 434/416 |
| 5,067,287 | 11/1991 | Lewis | 52/29 |
| 5,085,608 | 2/1992 | Turner | 446/75 |

*Primary Examiner*—Bipin H. Shalwala
*Assistant Examiner*—Vincent E. Kovalick
*Attorney, Agent, or Firm*—Rossi & Associates

[57] ABSTRACT

A portable, light weight support stand for vertical mounting and use of a flexible digitizer. The stand is placed against a wall or other vertical structure so that writing pressure on the digitizer is supported by the wall and not by the stand. The entire structure is supported by legs extending at an angle from the stand to a floor adjacent to the supporting wall. The result is a very light weight, highly portable structure that provides all of the support necessary to maintain writing operations on a flexible digitizer while avoiding the weight and awkwardness of conventional rigid digitizers and support stands.

20 Claims, 7 Drawing Sheets

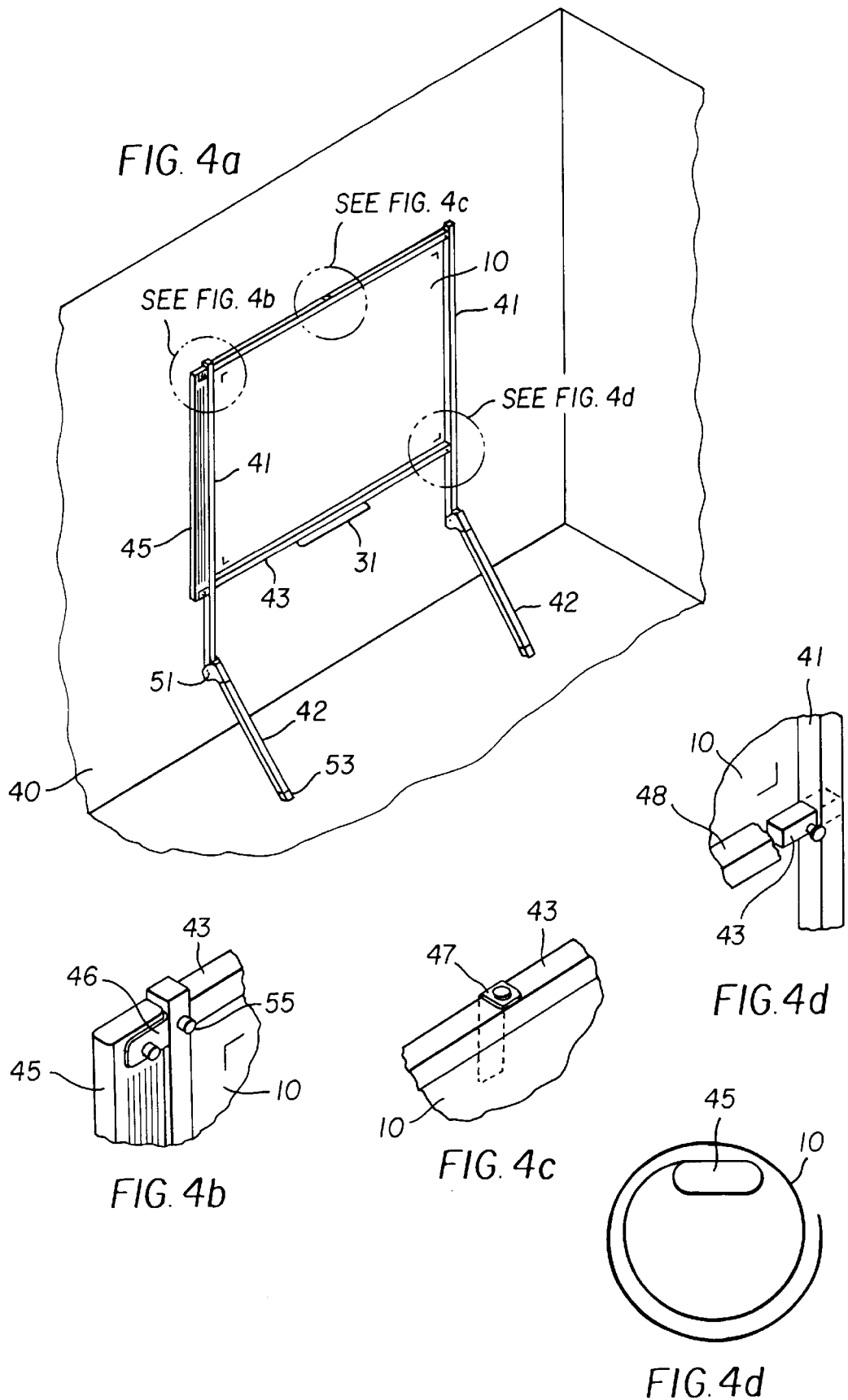

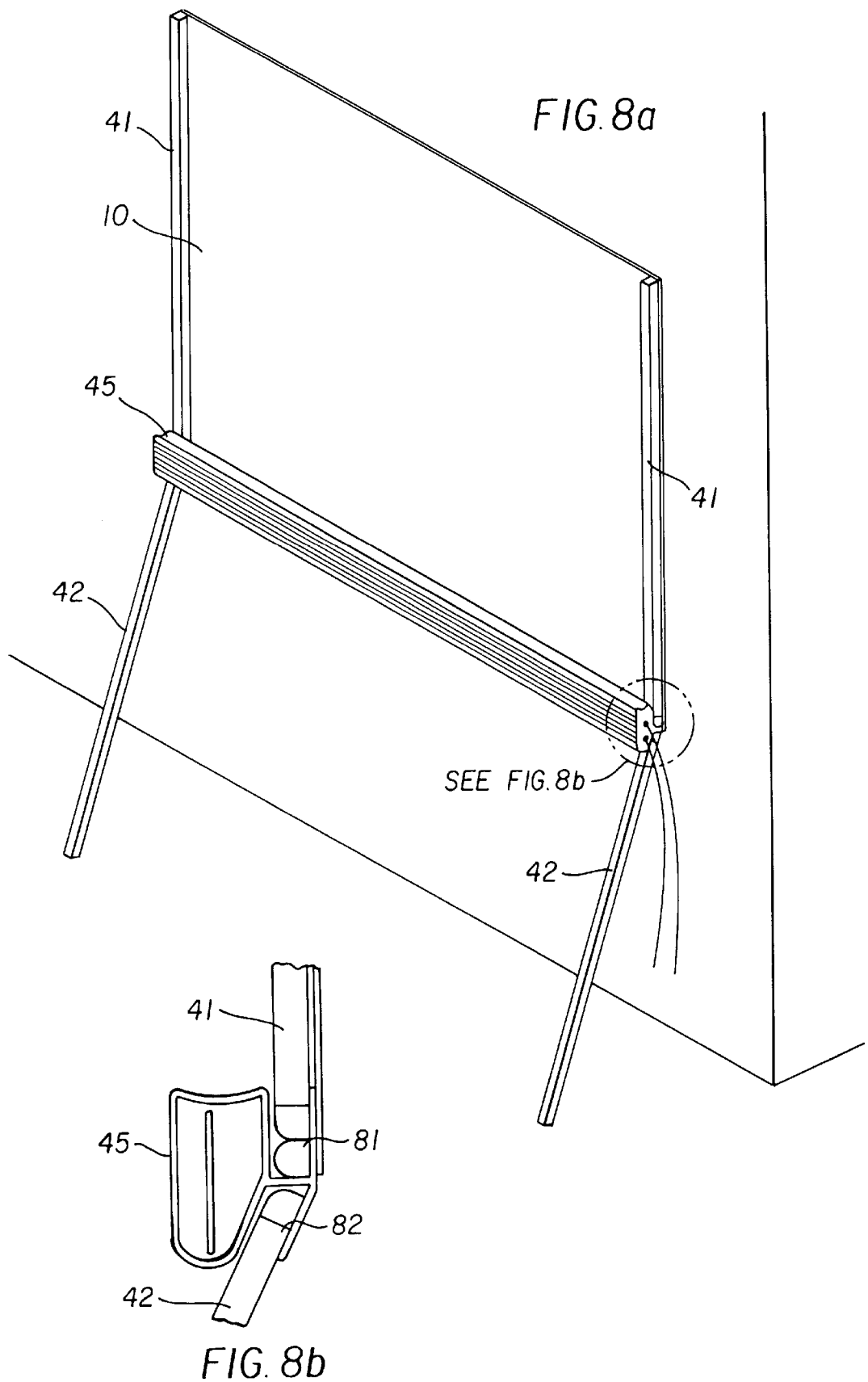

LEAN-TO STAND FOR FLEXIBLE DIGITIZER

TECHNICAL FIELD

The present invention resides in the field of supports for graphics tablets, known as digitizers and used as computer peripherals. In particular, the present invention is directed to a lightweight stand arranged to support a flexible digitizer to be used in an application requiring rigid support for the surface of the digitizer.

BACKGROUND ART

Digitizers, also known as graphic tablets, are computer peripherals used to manually input graphic information with an electronic pen or cursor. The size of digitizers are normally ranked as small, medium, and large format. Large format digitizers, with active areas typically ranging from 24"×36" to 44"×60", as (10 in FIG. 1) are usually supported by a table 12 as depicted in FIG. 1 or a pedestal 13 as depicted in FIG. 2, and are used in either horizontal or inclined position. These support arrangements work well for digitizer applications that use paper drawings such as construction cost estimating, map or image analysis or computer-aided design. Computerized meeting systems is a new application for large format digitizers. The digitizer in this application is sometimes referred to as a digital whiteboard. When used as a digital whiteboard, the digitizer must be mounted vertically, as shown in FIG. 3, so that the meeting participants can easily view the information that has been either projected and/or hand written on the digitizer with special electronic markers.

The design of a vertical-mounting stand for a rigid digital whiteboard, as depicted in FIG. 3, is relatively straightforward. In this design two inverted "T" legs 30 are fabricated from tubular steel and have casters 34 attached at the bottom of each leg. A horizontal cross member 32 provides rotational stiffness for the "T" legs. The inverted "T" legs are attached to an edge extrusion 14 of the digitizer. This arrangement results in a freestanding, self-supporting horizontally stiff, vertically mounted digitizer that can be rolled from place to place. This support arrangement is easily modified for various digitizer designs, and is very similar to support stands used for many types of mobile whiteboards, blackboards, message boards, etc. Standard whiteboards have been designed to provide the minimum amount of required horizontal stiffness to maintain a stable writing surface. However, even with a minimum-stiffness design, the weight of typical stand is approximately 25 pounds. This along with the weight of the whiteboard itself results in an arrangement that may be acceptable for fixed location use, but does not lend itself for portable applications.

Another type of digital whiteboard uses a lightweight, flexible digitizer. The lightweight and flexible nature of the design allows for easy transport either within an office building or to remote sites. Since this digitizer does not have any inherent stiffness, as do standard large format rigid digital whiteboards, it must be fully supported across its surface. A portable stand of the type used for a rigid digitizer would have to have a supporting structure for the tablet's surface. This support structure would have to be made of a relatively stiff material, such as wood or plastic. The high weight of the inverted "T" leg stand in conjunction with the weight of the tablet support structure for the flexible tablet makes the standard vertical stand design unsuitable for portable use. One of the design requirements that adds significantly to the weight of the inverted "T" leg stand design is that it be self supporting. When a user applies a force against the surface of the digitizer supported by the stand, as occurs during writing, the surface of the digitizer must remain relatively stationary. Any perceptible movement of the digital whiteboard surface would make it difficult for the user to write clearly. Consequently, a tradeoff is made; additional weight in the overall support structure for the digitizer in exchange for a stable writing surface. The conventional art does not provide an arrangement that allows a stable writing surface for a digitizer while requiring only the minimal weight for the overall digitizer and support stand arrangement.

SUMMARY OF THE INVENTION

It is the first object of the present invention to provide a lightweight arrangement effecting rigid support to a flexible digitizer.

It is another object of the present invention to provide a digitizer that is easily transportable without a support stand.

It is still another object of the present invention to provide an arrangement whereby a support stand for a flexible digitizer is easily broken down and transported.

It another object of the present invention to provide a flexible digitizer support arrangement that can be used easily by large groups in meetings.

It is yet a further object of the present invention to provide a support arrangement for flexible digitizer that does not require a stand to provide the stiffness for resisting horizontal forces.

It is a still a further object of the present invention to provide a support stand for a flexible digitizer that integrates the portability of the stand with the portability of the flexible digitizer.

It is again another object of the present invention to provide a support arrangement for a flexible digitizer while avoiding the cost of a rigid stand member to support the entire surface of the digitizer.

These and other benefits of the present invention are achieved by an arrangement that utilizes existing an vertical structure to support a flexible digitizer, this arrangement includes:

(a) at least two vertical support system;

(b) at least one horizontal support; and, (c) connections holding the display to at least one of the vertical and horizontal supports.

Also included are two legs connected to at least one of the vertical and horizontal supports. These legs extend at an angle from the supporting vertical surface to be supported on a supporting horizontal surface which is adjacent to the supporting vertical surface. Another embodiment of the present invention is practiced by a process for supporting a flexible tablet. This process includes positioning the flexible tablet so that a first surface of the tablet is substantially flat and attaching a framework thereto. Afterwards the framework is positioned next to a wall so that a second surface of the flexible tablet is placed against the wall. Finally, support legs are extended at an angle from the framework to be supported by a floor adjacent to the wall.

BRIEF DESCRIPTION OF THE DRAWINGS

The invention will be described in greater detail with reference to certain preferred embodiments of the invention and the accompanying drawings, wherein:

FIG. 4a is a perspective diagram depicting an arrangement for supporting a flexible digitizer according to the present invention.

FIGS. 4b–4e are cut-away views depicting various details of the arrangement of FIG. 4a.

FIG. 8a is a perspective diagram of a third embodiment of the present invention.

FIG. 8b is a cut-away view depicting some of the details of FIG. 8a.

DETAILED DESCRIPTION OF THE PREFERRED EMBODIMENTS

Figure 1:
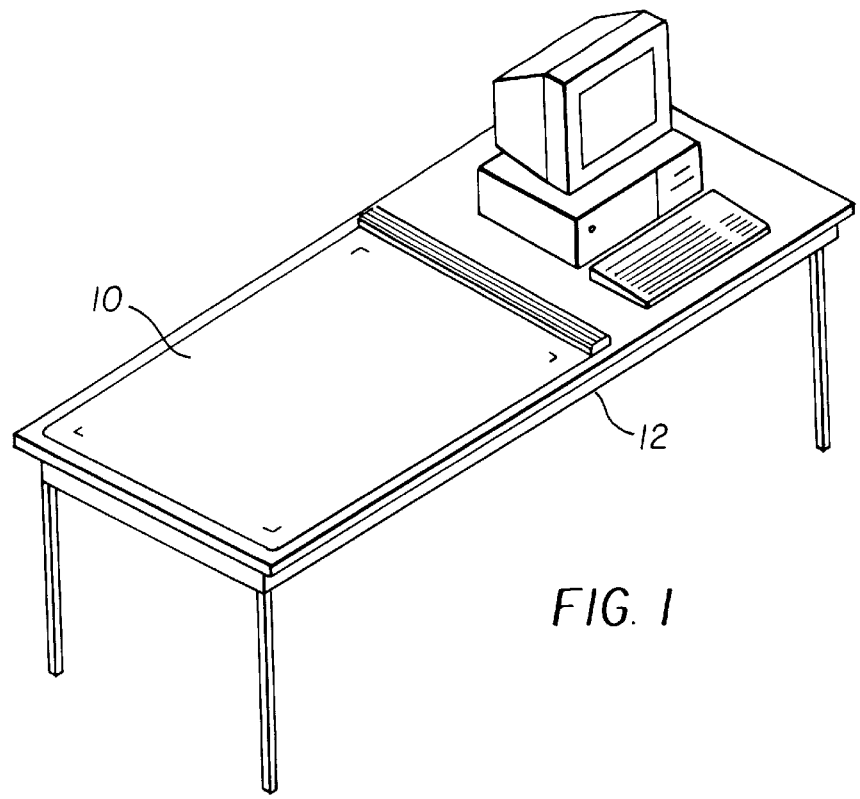
FIG. 1 is a perspective diagram depicting a first conventional arrangement for supporting a digitizer.
Figure 2:
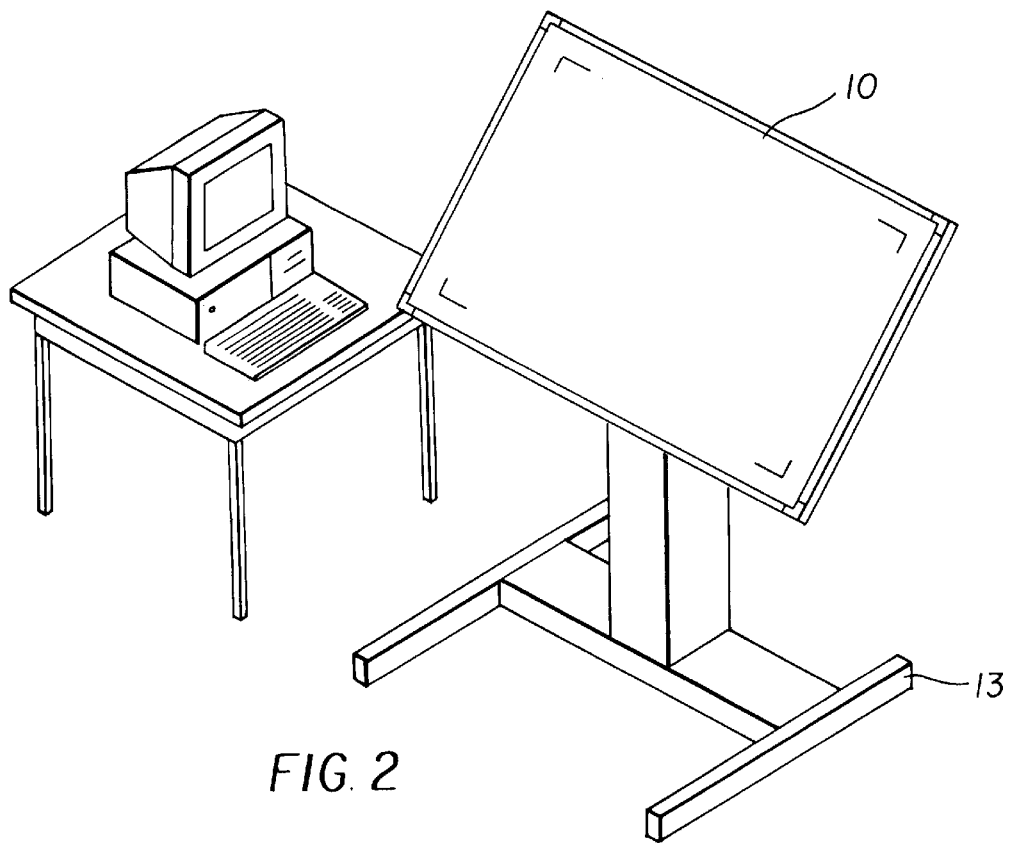
FIG. 2 is a perspective diagram depicting a second conventional arrangement for supporting a digitizer.
Figure 3:
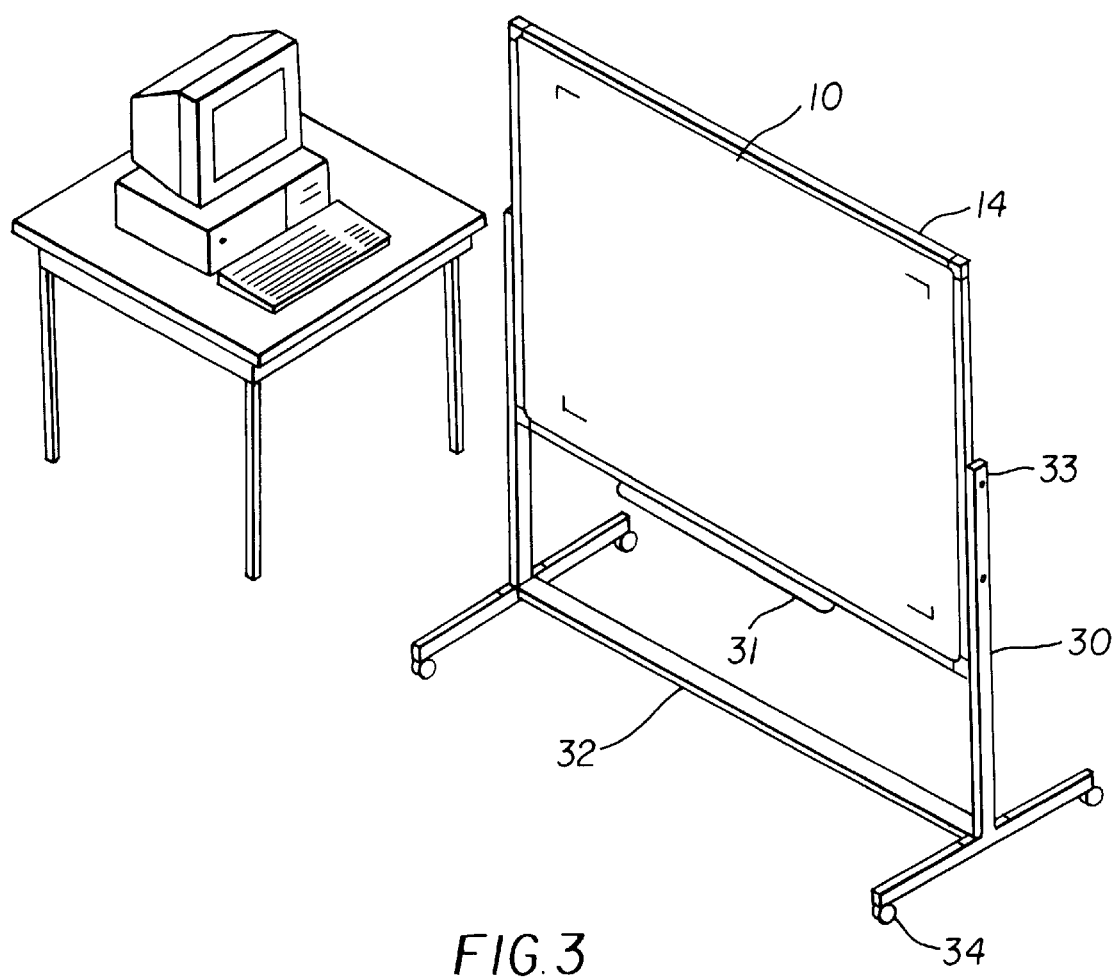
FIG. 3 is a perspective diagram depicting a conventional vertical support for a rigid digitizer.

The first embodiment of the present invention is depicted in FIG. 4a, which uses the same drawing designations as in FIGS. 1–3, when appropriate. A key feature of the present invention is the use of an alternative to the conventional stand designed to support the entire surface of a flexible digitizer. This support is provided by a vertical surface against which the flexible digitizer is placed to provide support for it. Preferably, such a vertical surface is constituted by a wall such as those found in the offices in which the flexible digitizer is used. In this design, the stand has only to support the weight of the rolled-up flexible digitizer, thereby eliminating any need for a stand structure to provide a stiff writing surface. As a result, the design of the present invention is drastically simplified and it's weight minimized.

As depicted in FIG. 4a the writing support for the entire surface of the digitizer 10 is provided by vertical wall 40. The flexible digitizer is held in place (extended from controller extrusion 45) by two vertical supports 41 and two horizontal supports 43. This support structure, along with the flexible digitizer, is held against wall 40 by two legs 42 extending at an angle in the wall and supported by the floor. Preferably, the entire structure is designed of light-weight aluminum alloy and weighs approximately 7.5 pounds. As with conventional designs the flexible digitizer support structure includes a pen tray 31 for storage of the special electronic implements used with such devices.

As depicted in FIG. 4e, a controller extrusion 45 is attached to one end of the flexible digitizer 10 in order to provide the necessary interface to a controller. When not in use, the flexible digitizer is wrapped around controller extrusion thereby providing easy transport. In the FIG. 4a embodiment the controller extrusion is attached to one of the horizontal supports 43 by means of mounting bracket 46, as depicted in FIG. 4b. Virtually any connecting means can be used to hold the structure together, and are preferably thumb screws with knurled heads that allow easy hand assembly and disassembly. The horizontal supports 43 are attached to the vertical supports 41 by means of tube fittings 48, as depicted in FIG. 4d. These are preferably held in place using thumb screws with knurled heads requiring no additional tools. However, any appropriate connecting means may be used.

Because the digitizer 10 is flexible, and is often stored in a rolled position as indicated by FIG. 4e, it is necessary to hold the digitizer to both the horizontal supports 43, and the vertical support 41 opposite the controller extrusion 45. This is facilitated through the use of strap and snap assemblies 47 as depicted in FIG. 4c. As many of these assemblies are used as is necessary, depending upon the size of the digitizer. While the strap and snap assembly 47 is not used to physically support the digitizer, they hold the digitizer to the vertical and horizontal supports thereby maldng placement against wall 40 much easier since the digitizer is held relatively flat along the structure constituted by vertical supports 41 and horizontal supports 43.

Figure 5A:
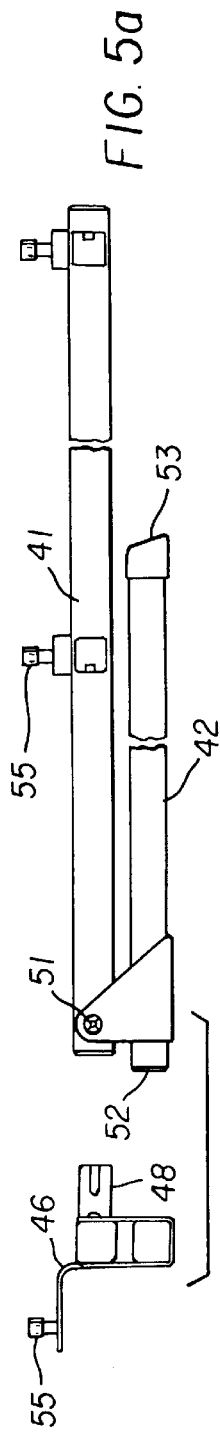
FIGS. 5a–5d are elevation and side views depicting various elements constituting the support structure of FIG. 4.
Figure 5B:
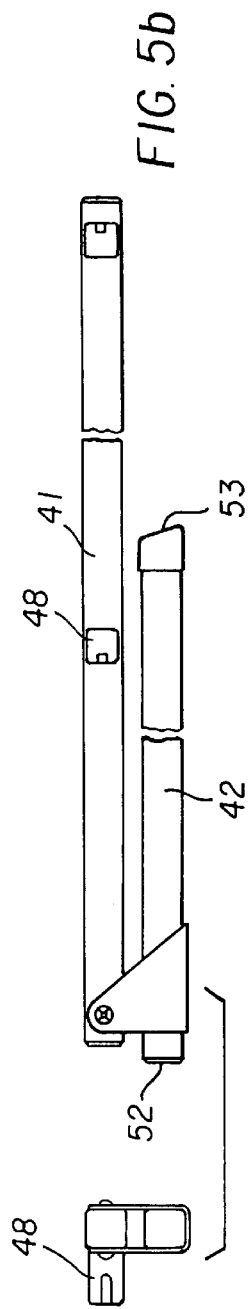
Figure 5C:
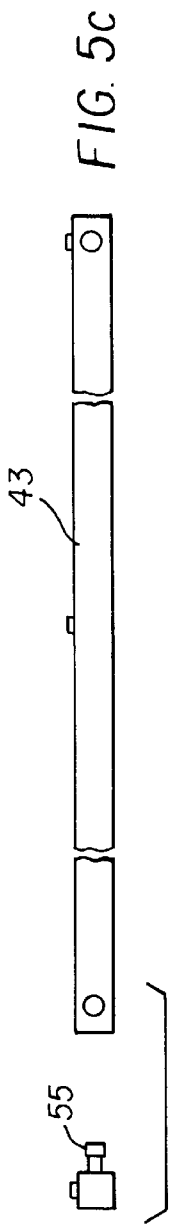
Figure 5D:
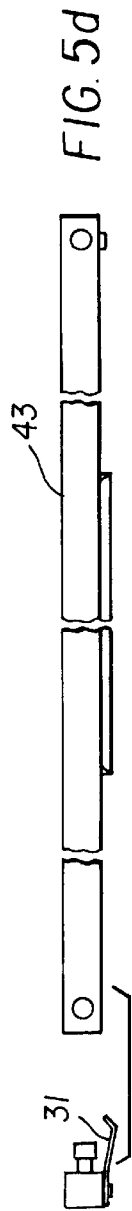

It is clear that the support for writing on the digitizer 10 is provided by wall 40 while support for the entire frame (vertical supports 41 and horizontal supports 43) holding the digitizer is provided by the particular arrangement of legs 42 which extend from wall 40 at an angle to derive support from the floor adjacent to the wall. The structure that makes this possible is best depicted in FIGS. 5a and 5b. Each of these figures is an elevation view and an end view of the leg 42 and it's attachment to the vertical support 41 by means of a hinged arrangement 51. As depicted in FIGS. 5a and 5b, the legs are shown in the folded or travel position. When folded out to support the vertical supports 41, leg 42 swung around the bottom of the vertical support so that the top portion 52 of the leg is placed against the side of the vertical support having some screws 55, and the bottom 53 of the leg rests on the floor adjacent to wall 40. Preferably the top and bottom of the leg is fitted with a plastic or rubber cap to facilitate a high friction contact with the vertical support leg and the floor. Such caps also avoid damage to the floor, the leg and the vertical support when the leg is positioned to support the digitizer against the wall. The bottom 53 of the support leg 42 is angled to match the angle of the leg with respect to the supporting wall 40. Preferably, this angle is approximately 45°, although the invention can be practiced using other angles. The same operation applies with respect to the leg associated with the second vertical support depicted in 5b.

As is apparent from the arrangements of FIGS. 5a–5d, the structure of FIG. 4a is easily disassembled into two vertical supports 41 with folding legs 42, two horizontal supports 43 and a controller extrusion 45 holding the flexible whiteboard 10, which is rolled for transport. The whole assembly is held together with tube fittings 48, bracket mountings 46, thumbscrews 55, as well as any appropriate screws and washers. Preferably, the digitizer tablet 10 is fastened to the stand using two support brackets 46, and three strap and snap assemblies 47. However, the present invention is not limited thereto and can be arranged with any appropriate number of mounting brackets and strap and snap assemblies.

Figure 6:
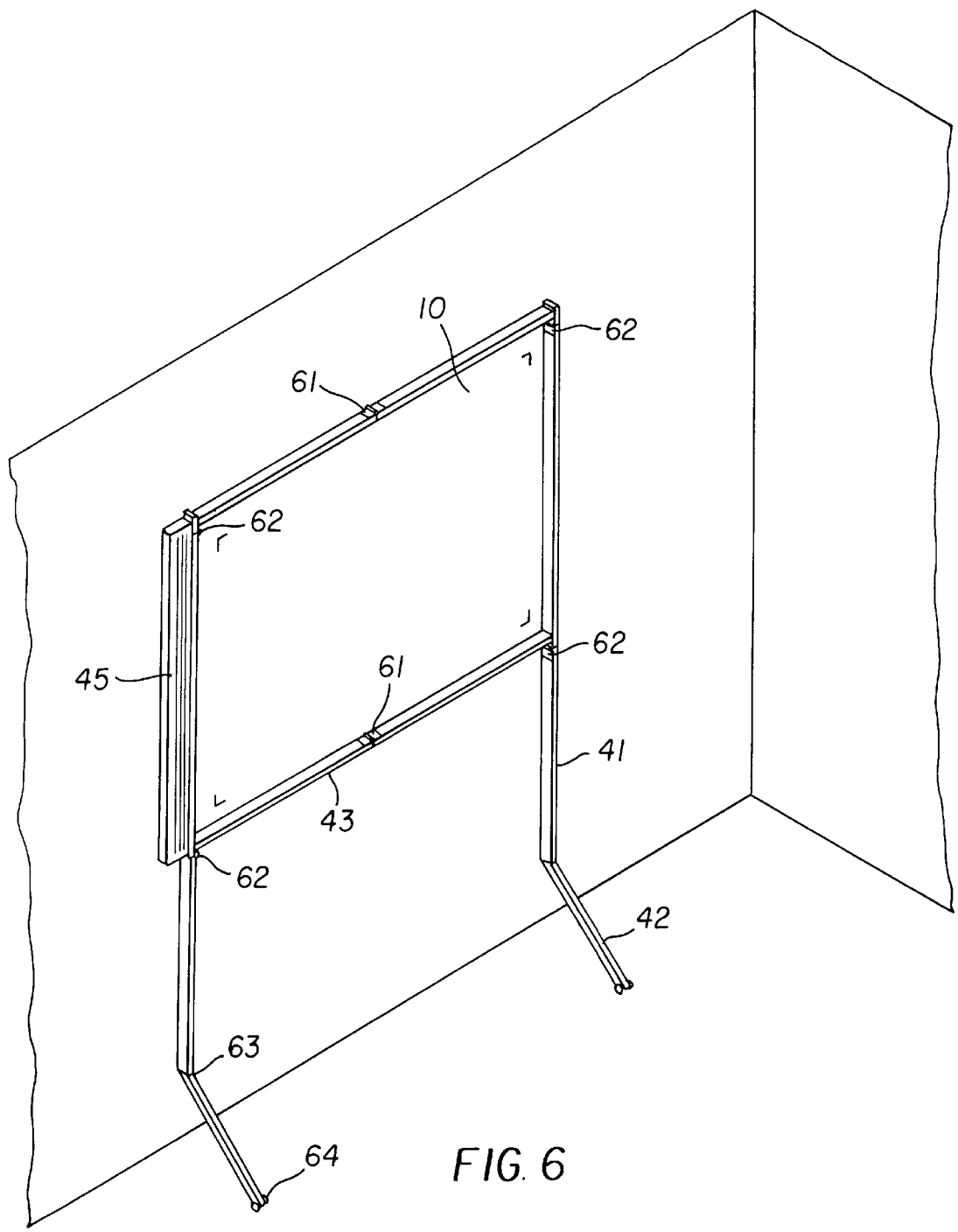
FIG. 6 is a perspective diagram depicting an alternative embodiment of the present invention.

The embodiment of FIG. 6 facilitates greater transportability for the support structure. Rather than disassembling the vertical supports 41 from the horizontal supports 43, only the controller extrusion 45 is removed from the support structure when being transported. In contrast with the arrangement of the first embodiment as depicted in FIG. 4a, the embodiment of FIG. 6 includes the use of two horizontal hinges 61 on the horizontal supports 43 and 4 vertical hinges 62 connecting the horizontal supports to the vertical supports 41. The hinge arrangement 63 can be the same as 51 depicted in FIGS. 5a and 5b, or can be a different arrangement that merely allows legs 42 to rotate into a collinear relationship with vertical supports 41. The feet of the legs 64 can be the same arrangements as 53 depicted in FIGS. 5a and 5b, or can be some other arrangement such as retractable casters.

Figure 7:
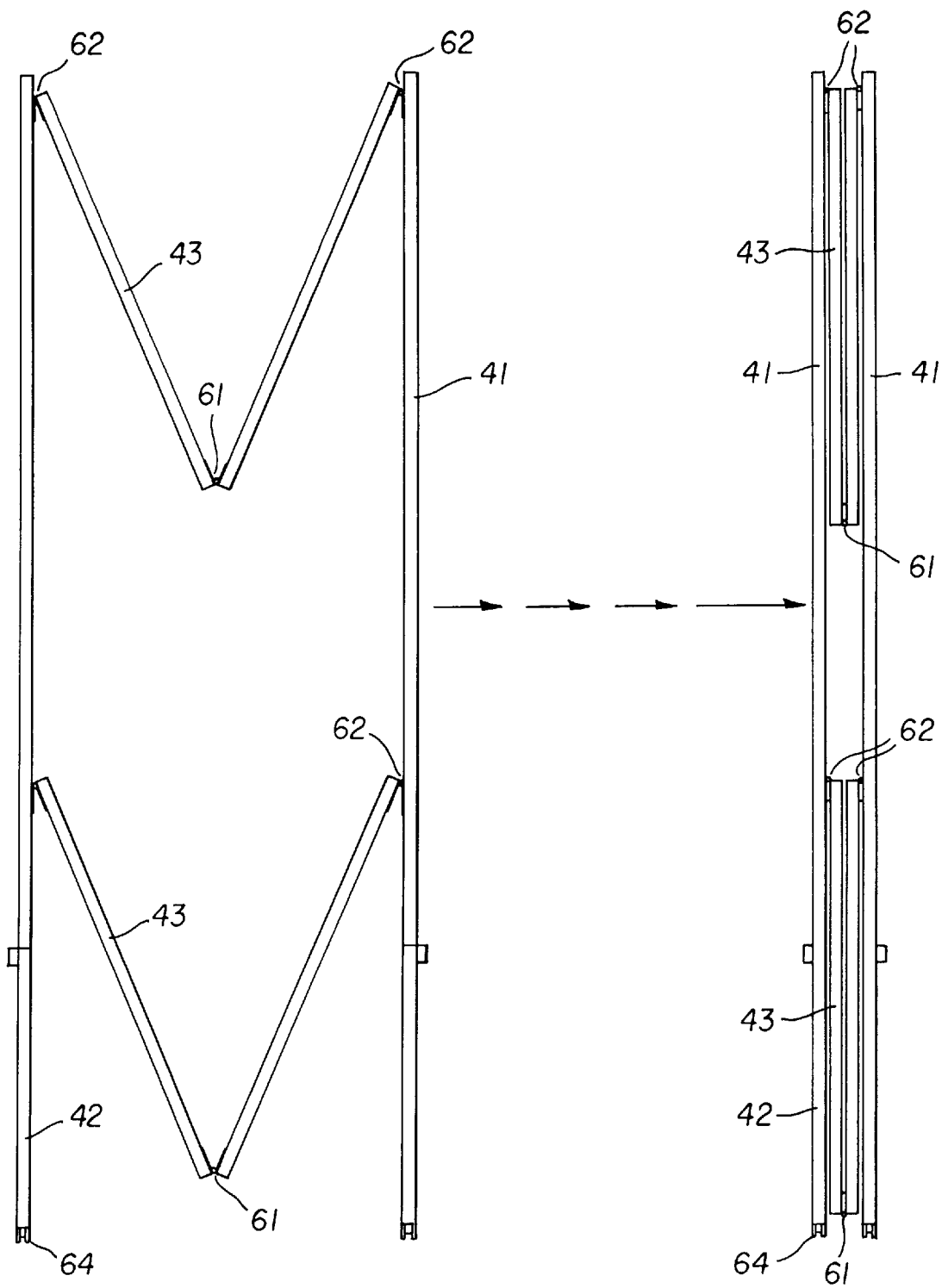
FIGS. 7a and 7b are side views depicting different positions of the support structure of FIG. 6.

FIG. 7 depicts the support structure of FIG. 6 in two positions. The left hand side of FIG. 7 shows a partially folded support structure illustrating the operation of hinges 62 and 61. The right hand side of FIG. 7 illustrates the support structure in a completely folded position, ready for easy transport. A key advantage of this embodiment is that only the controller extrusion 45 must be attached or reattached to the support structure. Thus, only two separate pieces need to be transported.

A one piece digitizer-stand assembly is achieved in the embodiment of FIGS. 8a and 8b. In this arrangement, the controller extrusion (with an integral pen tray) is placed in the position of the lower horizontal support 43 of the FIG. 4a embodiment. The flexible digitizer tablet 10 extends upwards from the controller extrusion behind the vertical supports 41. The flexible digitizer tablet is fasten to the controller extrusion using high bond strength adhesive tape or some other appropriate bonding system. While not in use, or being transported, the arrangement illustrated in FIG. 8a can be folded into one piece. This is accomplished by folding the two vertical supports towards each other into positions parallel with the controller extrusion 45. The same is done with legs 42. Depending upon the size of the overall digitizer, the vertical supports can be folded in collinear relationship with each other, or in parallel. The same is true with legs 42. Once the vertical supports and legs are folded into parallel positions with the controller extrusion, the flexible digitizer can be wrapped around the entire assembly for transport as a single piece. Hinge assemblies 81 and 82 as depicted in FIG. 8b hold the vertical supports 41 and legs 42, respectively. The precise structure of these hinges can be any arrangement appropriate to the size and the material of the legs, vertical supports and controller extrusion.

While the embodiments of FIGS. 4a and 6 are designed specifically for a flexible digital whiteboard, the support designs could be modified for use with conventional whiteboards, message boards, blackboards, or any large writing surface that lacks inherent stiffness, such as a large pad of paper. Any variation of the previously-described arrangements can be used both with the flexible digital whiteboard and any other message board to which the present invention can be adapted.

Thus, although the aforementioned description contains specific embodiments, they should not be construed as limiting the scope of the invention. Rather, these are merely illustrations of some of the presently preferred embodiments of the present invention. For example, any appropriate arrangement for the feet of the support legs, including spikes for holding the structure to soft surfaces, can be used in the practice of the present invention. Accordingly, the present invention should be considered to include any and all configurations, modifications, variations, combinations, equivalent arrangements or expansions falling within the scope of the following claims.

What is claimed is:

1. A support system for display means, arranged to hold said display means against a supporting vertical surface, said support system comprising:
    (a) at least two vertical supports;
    (b) at least one horizontal support;
    (c) means for holding said display means to at least one of said vertical and horizontal supports; and,
    (d) at least two legs connected to at least one of said vertical and horizontal supports, and extending at an angle from said supporting vertical surface to be supported on a supporting horizontal surface adjacent to said supporting vertical surface.

2. The support system of claim 1, wherein a surface of said display means is supported in a vertical position with sufficient rigidity that writing operations can be carried out on said surface without substantial movement of said surface.

3. The support system of claim 2, wherein said display means comprise a flexible whiteboard digitizer used as a computer peripheral.

4. The support system of claim 3, wherein said supporting vertical surface comprises a wall of a room containing said support system.

5. The support system of claim 4, wherein said supporting horizontal surface comprises a floor of said room.

6. The support system of claim 5, further comprising a controller extrusion associated with one of said vertical and horizontal supports, said control extrusion comprising means for controlling said digitizer and connected thereto.

7. The support system of claim 6, wherein said angle is approximately 45°.

8. The support system of claim 7, wherein a framework is arranged from two vertical supports and two horizontal supports, and each of said legs is connected to a respective one of said vertical supports.

9. The support structure of claim 8, wherein each of said legs is connected to it's respective vertical support by means of a hinge that permits rotation of said leg about one end of said vertical support.

10. The support system of claim 7, wherein one end of each said leg is formed at an angle of approximately 45° where said leg meets said floor.

11. The support system of claim 8, wherein each horizontal support comprises a hinge in it's center and each vertical support comprises a hinge connecting it to each said horizontal support.

12. The support system of claim 11, wherein said legs are attached to said vertical supports by pivots that permit said legs to become collinear with said vertical support.

13. The support system of claim 6, wherein said digitizer is supported on a frame consisting of two vertical supports connected by said controller extrusion.

14. The support system of claim 13, wherein said vertical supports and said legs are attached to said control extrusion and configured to rotate at said ends of said control extrusion so as to be arranged parallel to said control extrusion.

15. A process for supporting flexible display means, comprising:
    (a) positioning said flexible display means so that a first surface of said display means is substantially flat and attaching a framework thereto;
    (b) positioning said framework next to a wall so that a second surface of said flexible display means is placed against the wall; and,
    (c) extending support legs at an angle from said framework to be supported by a floor adjacent to said wall.

16. The process of claim 15, wherein said flexible display means is substantially supported so that a writing operation can be carried out on it without perceptibly moving said flexible display means.

17. The process of claim 16, wherein said angle is approximately 45°.

18. The process of claim 17, wherein step a comprises the substep of forming said framework of two vertical parallel supports and two parallel horizontal supports.

19. The process of claim 18, wherein step c comprises substep of unfolding said support legs from a position parallel to said vertical supports.

20. The process of claim 19, wherein step c further comprises the substep of establishing high-resistance contact between said floor and said support legs.

* * * * *